United States Patent
Ebner et al.

(10) Patent No.: US 11,613,229 B2
(45) Date of Patent: Mar. 28, 2023

(54) PEDESTRIAN PROTECTION DEVICE FOR A VEHICLE

(71) Applicant: Audi AG, Ingolstadt (DE)

(72) Inventors: Anca Ebner, Kösching (DE); Holger Staack, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/626,094

(22) PCT Filed: Jun. 13, 2018

(86) PCT No.: PCT/EP2018/065690
§ 371 (c)(1),
(2) Date: Dec. 23, 2019

(87) PCT Pub. No.: WO2019/020268
PCT Pub. Date: Jan. 31, 2019

(65) Prior Publication Data
US 2020/0207303 A1      Jul. 2, 2020

(30) Foreign Application Priority Data

Jul. 22, 2017   (DE) ..................... 10 2017 006 977.8

(51) Int. Cl.
*B60R 21/34*       (2011.01)
*B60R 19/26*       (2006.01)

(52) U.S. Cl.
CPC ............. *B60R 21/34* (2013.01); *B60R 19/26* (2013.01); *B60R 2019/262* (2013.01); *B60R 2021/343* (2013.01)

(58) Field of Classification Search
CPC ............. B60R 21/34; B60R 2021/343; B60R 2019/262; B60R 19/26
(Continued)

(56) References Cited

U.S. PATENT DOCUMENTS

| 6,871,889 | B2 * | 3/2005 | Ericsson | B60R 19/28 293/133 |
| 7,004,608 | B2 | 2/2006 | Goller | |
| 8,342,596 | B2 * | 1/2013 | Mildner | B60R 19/36 296/187.09 |
| 8,616,622 | B2 * | 12/2013 | Davis | E05F 5/022 296/193.11 |

(Continued)

FOREIGN PATENT DOCUMENTS

| DE | 102 11 972 A1 | 10/2003 |
| DE | 10358492 A1 | 7/2005 |

(Continued)

OTHER PUBLICATIONS

International Search Report and Written Opinion directed to related International Patent Application No. PCT/EP2018/065690, dated Sep. 13, 2018, with attached English-language translation; 15 pages.

(Continued)

*Primary Examiner* — D Glenn Dayoan
*Assistant Examiner* — Dana D Ivey
(74) *Attorney, Agent, or Firm* — Sterne, Kessler, Goldstein & Fox P.L.L.C.

(57) ABSTRACT

A pedestrian protection device of a vehicle includes a first body element mounted to the vehicle and having a connecting section. The pedestrian protection device includes a second body element that includes a hollow profile section. The first body element is movably received in the hollow profile section. The pedestrian protection device includes an elastically deformable exterior component connected to the second body element. The hollow profile section of the second body element is displaced from a rest position to a crash position upon the application of force against exterior component. The pedestrian device includes a latching device that releasably latches the connecting section of the first body element with the hollow profile section of the second body element when set in the crash position.

19 Claims, 5 Drawing Sheets

(58) Field of Classification Search
USPC ............. 296/187.04, 187.11, 187.12, 187.03
See application file for complete search history.

(56) References Cited

U.S. PATENT DOCUMENTS

| | | | |
|---|---|---|---|
| 9,206,089 B2 * | 12/2015 | Inuzuka | ................. F15B 15/19 |
| 2007/0114804 A1 | 5/2007 | Gross et al. | |
| 2016/0068125 A1 * | 3/2016 | Wendel | ................. B60R 19/26 |
| | | | 293/133 |

FOREIGN PATENT DOCUMENTS

| | | |
|---|---|---|
| DE | 60316232 T2 | 6/2008 |
| DE | 10 2009 001 038 A1 | 9/2010 |
| DE | 102010022998 A1 | 12/2010 |
| DE | 102009056923 A1 | 6/2011 |
| DE | 10 2011 081 772 A1 | 2/2013 |
| DE | 102013016238 A1 | 7/2014 |
| EP | 1 386 794 A1 | 2/2004 |
| JP | 2015174548 A | 10/2015 |

OTHER PUBLICATIONS

International Preliminary Report on Patentability directed to related International Patent Application No. PCT/EP2018/065690, dated Jan. 28, 2020, with attached English-language translation; 11 pages.
German Application No. 102017006977.8, Office Action dated Apr. 8, 2022; 12 pages.

* cited by examiner

PEDESTRIAN PROTECTION DEVICE FOR A VEHICLE

TECHNICAL FIELD

The present invention relates to a pedestrian protection device for a vehicle.

BACKGROUND

Front and rear bumper assemblies are installed on vehicles to reduce the collision energy or to influence the impact kinematics in cases of vehicle or pedestrian impact. In addition to absorbing the high energies of a vehicle collision, such bumper assemblies should therefore be able to provide effective protection for pedestrians. To be able to protect pedestrians, the bumper system must be deformable. What is known in this regard is that this can be achieved either by a plastic deformation or by a significant elastic deformation followed by an intentional failure.

Both the plastic deformation and the failure of the components involved in the pedestrian protection function device are irreversible and therefore permanently impair their function. This often leads to conflicts of interest with regard to the lowest possible type of damage in the classification of the type of vehicle required by insurance law. Possible consequences are unfavorable insurance ratings of the vehicles or complex and less robust components that are designed to fail, which can lead to additional costs.

DE 102 11 972 A1 relates to a lighting unit for vehicles with which the risk of injury is minimized in the event a pedestrian collides with the front of a vehicle. This is achieved in this known lighting unit by a front-side disk, which yields under force.

DE 10 2009 001 038 A1 discloses a unit at the front of the vehicle with a central support member for receiving a radiator and with left and right headlamp supports on which a headlamp unit is attached to each.

SUMMARY OF INVENTION

It is the objective of the present invention to provide a pedestrian protection device for a vehicle with which specific conflicts regarding the requirements for pedestrian protection, type-damage requirements and requirements relating to dynamic operating loads are minimized.

This objective is achieved by a pedestrian protection device having the features of claim 1 and by a pedestrian protection device having the features of claim 10.

According to the former solution, such a pedestrian protection device for a vehicle comprises:

a vehicle-mounted first body element, which has a connecting section, a second body element formed with a hollow profile section wherein the connecting section of the first body element is movably arranged in the hollow profile section, an elastically deformable exterior component of the vehicle, which is connected to the second body element wherein a displacement of the second body element of the connecting section caused by a force acting on the exterior component can be moved in the hollow profile section from a rest position to a crash position, and a latching device, which is designed to releasably latch the connecting section of the first body element in the crash position with the hollow profile section.

In this pedestrian protection device according to an embodiment of the invention, force is applied to the second body element in the case of a crash load, for example due a collision with a pedestrian, which causes a relative displacement between the fixed first body element of the vehicle and the second body element into the crash position. The first and second body element are releasably locked in this crash position by means of the latching device so that the deformation of an exterior component connected to the second body element, for example an outer bumper skin, is maintained. Since the latching of the hollow profile section of the second body element to the first body element has been achieved by means of the latching device, this deformation can be reversed by means of an elastic spring-back without damaging the components involved.

It is particularly advantageous if, according to a further development of the solution presented above, the latching device is designed with a latching projection and at least one latching lug. Preferably, in this case the latching lug is arranged on the connecting section of the first body element while the hollow profile section of the second body element is formed together with the latching projection.

A further embodiment of the invention, according to the aforementioned solution, provides that the hollow profile section of the second body element is formed with at least two spaced hollow profile walls wherein the formation of the locking projection of the latching device has a hollow profile wall comprising a step that increases distance between the two hollow profile walls and wherein the at least one latching lug is formed on the connecting section so that the latching lug can engage with the step when the first body element is displaced into the crash position.

In this case, the connecting section of the first body element preferably comprises an initial section with which the connecting section protrudes into the hollow profile section of the second body element and forms its rest position. A latching section adjoining the initial section is formed with the at least one latching lug.

Another preferred embodiment of the invention provides for an alternative realization of the latching device, according to which a latching projection designed as a corrugation is arranged at the connecting section of the first body element, and the hollow profile section of the second body element is formed with the at least one latching lug.

In such a design of the latching device, a further development provides as well that the hollow profile section of the second body element is formed with at least two spaced hollow profile walls wherein a hollow profile wall has a step that increases the distance of the two hollow profile walls and wherein the hollow profile wall section adjoining the step is formed with the at least one latching lug, and the corrugation is formed on the connecting section such that the latching lug can latch with the corrugation when the first body element is displaced into the crash position.

In a further embodiment of the invention, the pedestrian protection device with this alternative latching device is designed such that the connecting section comprises an initial section with which the connecting section protrudes into the hollow profile section to form its rest position, and the connecting section comprises a latching section with the corrugation adjoining the initial section.

The process in which the connecting section is displaced into the crash position is reversed, according to a further development, by means of a tool with which the positive connection between the latching lug and the latching projection is released.

A pedestrian protection device for a vehicle according to the second solution mentioned comprises:

a vehicle-mounted first body element, which has a connecting section, a second body element formed with a hollow profile section wherein the connecting section of the first body element is movably arranged in the hollow profile section, an elastically deformable exterior component of the vehicle, which is connected to the second body element wherein a displacement of the second body element of the connecting section caused by a force acting on the exterior component can be moved in the hollow profile section from a rest position to a crash position, and a cone connection between the connecting section and the hollow profile section, which is designed to detachably connect the connecting section to the hollow profile section by the frictional engagement caused by the cone connection when the connecting section is displaced into the crash position.

In this pedestrian protection device according to an embodiment of the invention, force is applied to the second body element in the case of a crash load, for example due to a collision with a pedestrian, which causes a relative displacement between the fixed first body element of the vehicle and the second body element into the crash position as well. The crash position is determined in this case by a cone connection depending on the force acting on the second body element. As a result, the second body element is releasably locked in this crash position so that the deformation of an exterior component connected to the second body element, for example an outer bumper skin, is maintained. Since the locking effected by means of the cone connection of the hollow profile section of the second body element with the connecting section of the first body element in the crash position is releasable, this deformation is reversible and can thus be reversed by means of an elastic spring-back without damaging the components involved. The cone connection can be released by a force generated against the direction of the force acting on the second body element.

The second body element is connected to an exterior component of the vehicle with which, in the case of a crash load, the force acting on the second body element is transferable. In a case of a collision between a pedestrian and such an exterior component, which is designed, for example, as an outer bumper skin on the front of a vehicle, a temporary, i.e. releasable deformation of this exterior component is achieved by means of the latching between the first and the second body element. In the case of a crash load triggered by a pedestrian, a desired outer vehicle contour can thus be reversibly obtained despite the hard or highly elastic structure, which is at least partially formed by the first and second body element.

BRIEF DESCRIPTION OF THE FIGURES

The present invention will now be described in detail with the help of exemplary embodiments and with reference to the accompanying figures. In the drawings.

DETAILED DESCRIPTION OF THE FIGURES

Figure 3:
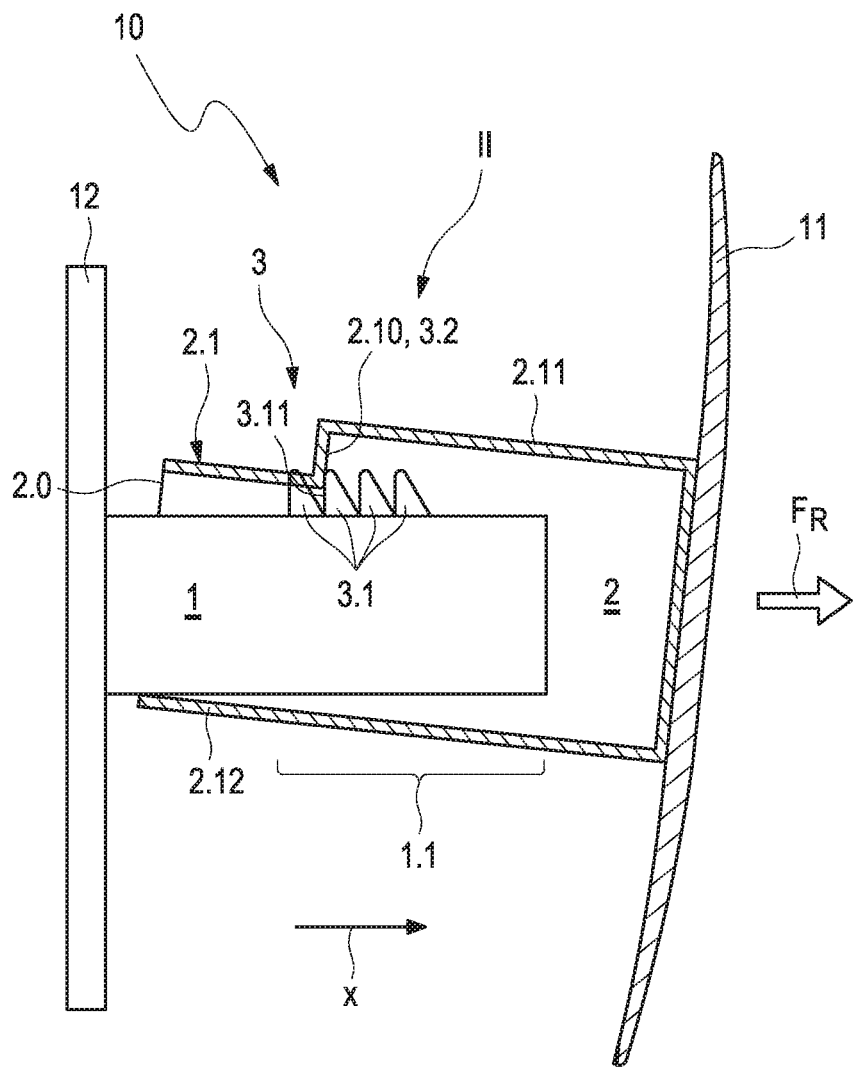
FIG. 3 shows a schematic illustration of the pedestrian protection device according to FIG. 1 in another activated state.
Figure 4:
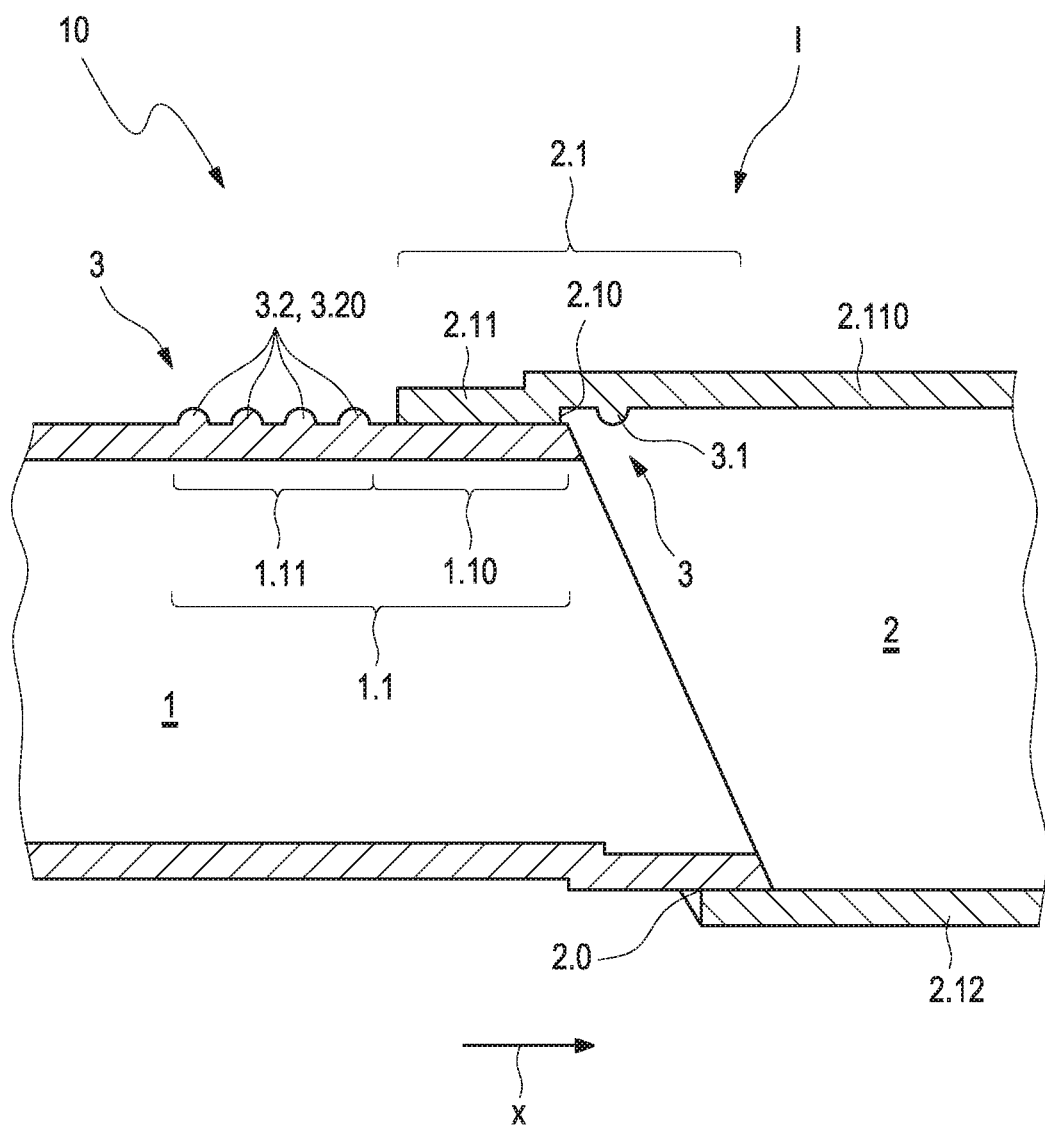
FIG. 4 shows a schematic illustration of a pedestrian protection device as a further exemplary embodiment of the present invention in a rest state.
Figure 5:
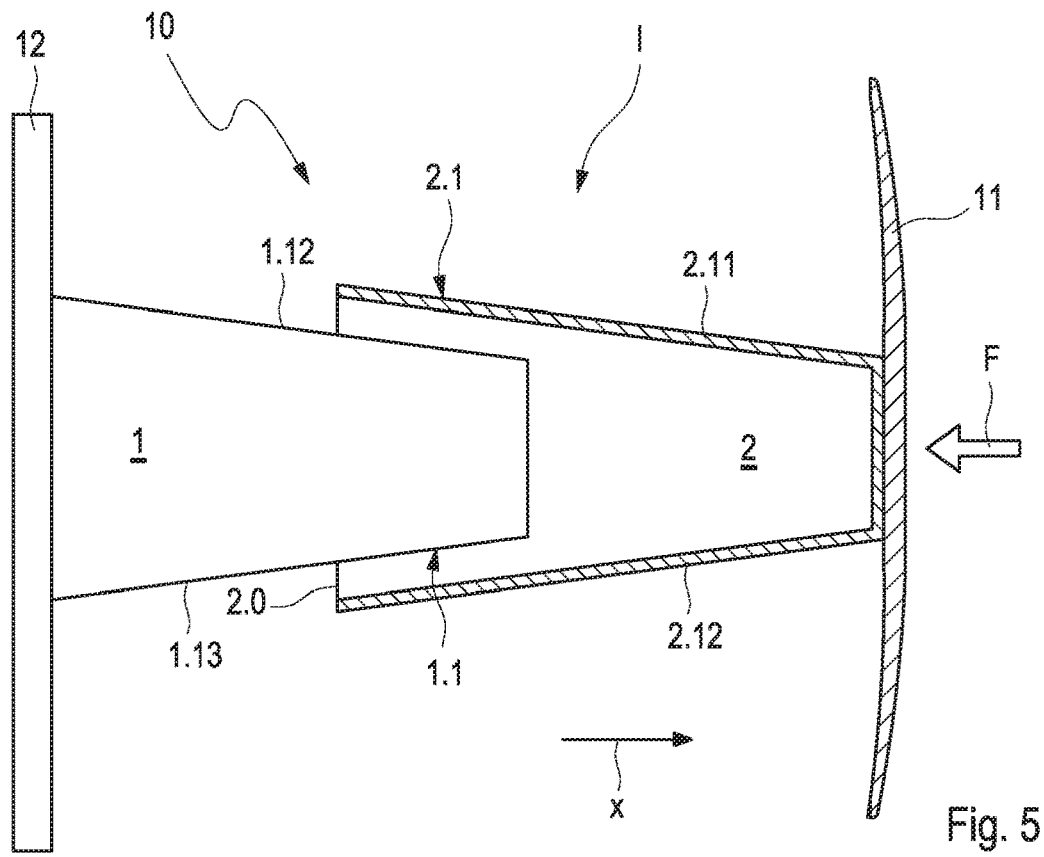
FIG. 5 shows a schematic illustration of a pedestrian protection device as a further exemplary embodiment of the present invention in a rest state.
Figure 6:
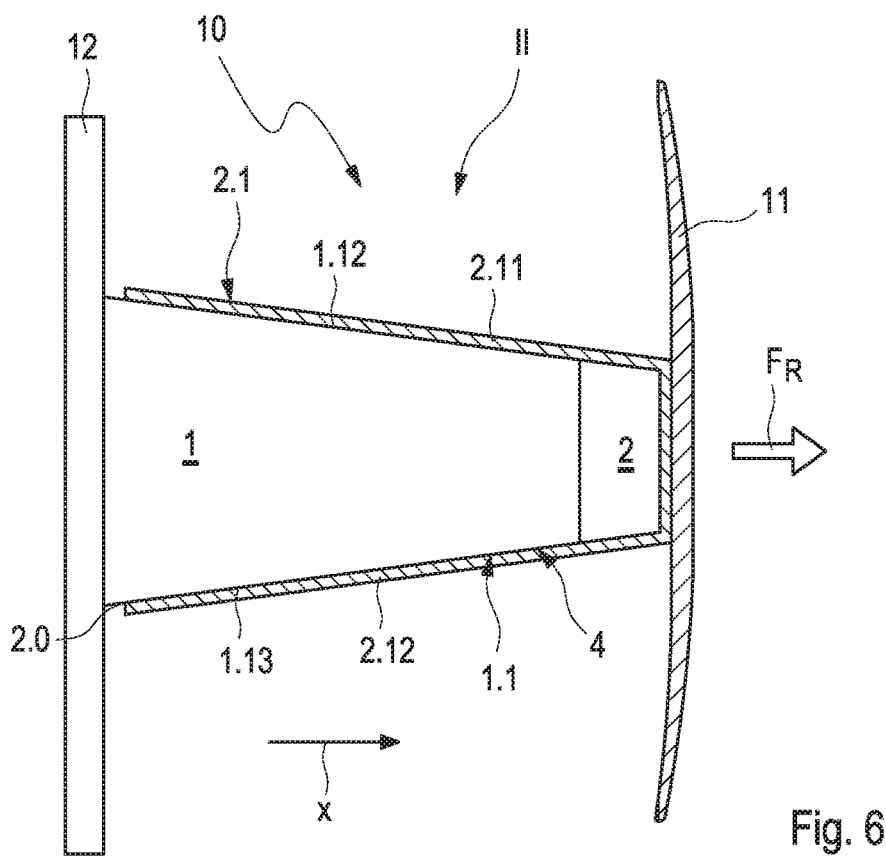
FIG. 6 shows a schematic illustration of the pedestrian protection device according to FIG. 5 in an activated state.

The pedestrian protection device 10 of a vehicle according to FIGS. 1 to 6 is used in the event of a collision between a pedestrian, cyclist or moped driver (FGS crash situation) and a vehicle, in particular its bumper cover (shown schematically by reference numeral 11 in FIGS. 1 to 3) to avoid but at least to minimize the risk of injury. For this purpose, a reversible, i.e. a temporary deformation of the bumper cover, is made possible by permitting a relative displacement between a first and a second body element and by latching these two body elements in the deformation state by means of a releasable latching device (FIGS. 1 to 4) or locking them by means of a cone connection (FIGS. 5 and 6). After this latching device or the cone connection has been released, the deformation is reversed.

Figure 1:
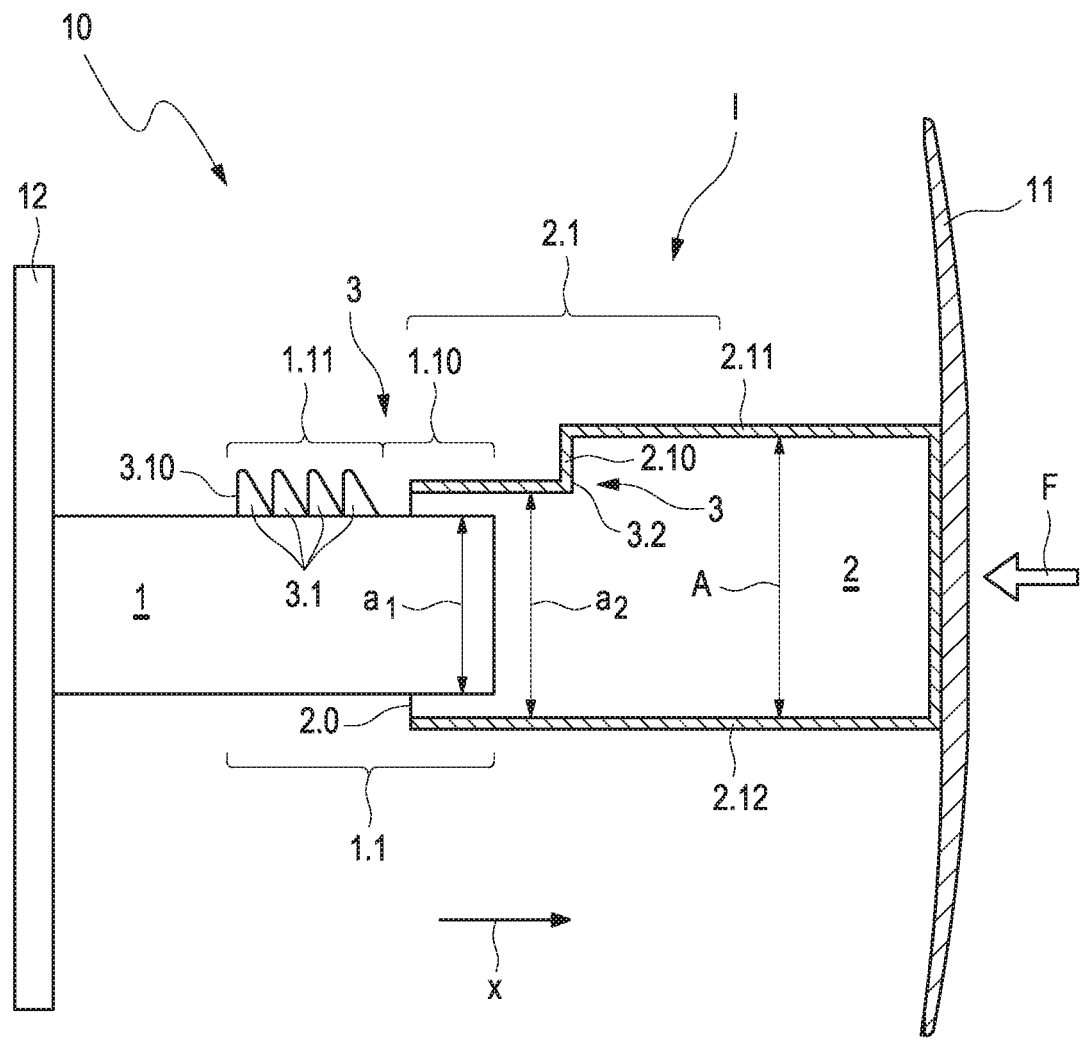
FIG. 1 shows a schematic illustration of a pedestrian protection device as an exemplary embodiment of the present invention in a rest state.

The pedestrian protection device 10 comprises, according to FIG. 1, a first body element 1, which is connected to a vehicle-fixed structure, namely a front end 12 of the vehicle. This front end 12 is indicated only schematically in FIG. 1.

This first body element 1 has a connecting section 1.1, which starting at the end comprises an initial section 1.10 and a latching section 1.11 connected thereto with a plurality of latching hooks 3.1 of a latching device 3. This first body element 1 may, for example, be a headlamp arm for receiving a main headlamp of the vehicle.

This vehicle-mounted first body element 1 projects with its initial section 1.10 into an opening 2.0 of a hollow profile section 2.1 of a second body element 2, which in turn is connected at its front end with an exterior component 11 of the vehicle. This exterior component 11 may, for example, be a bumper cover of a bumper. Thus, the second body element 2 is firmly mounted to the vehicle's bumper.

Figure 2:
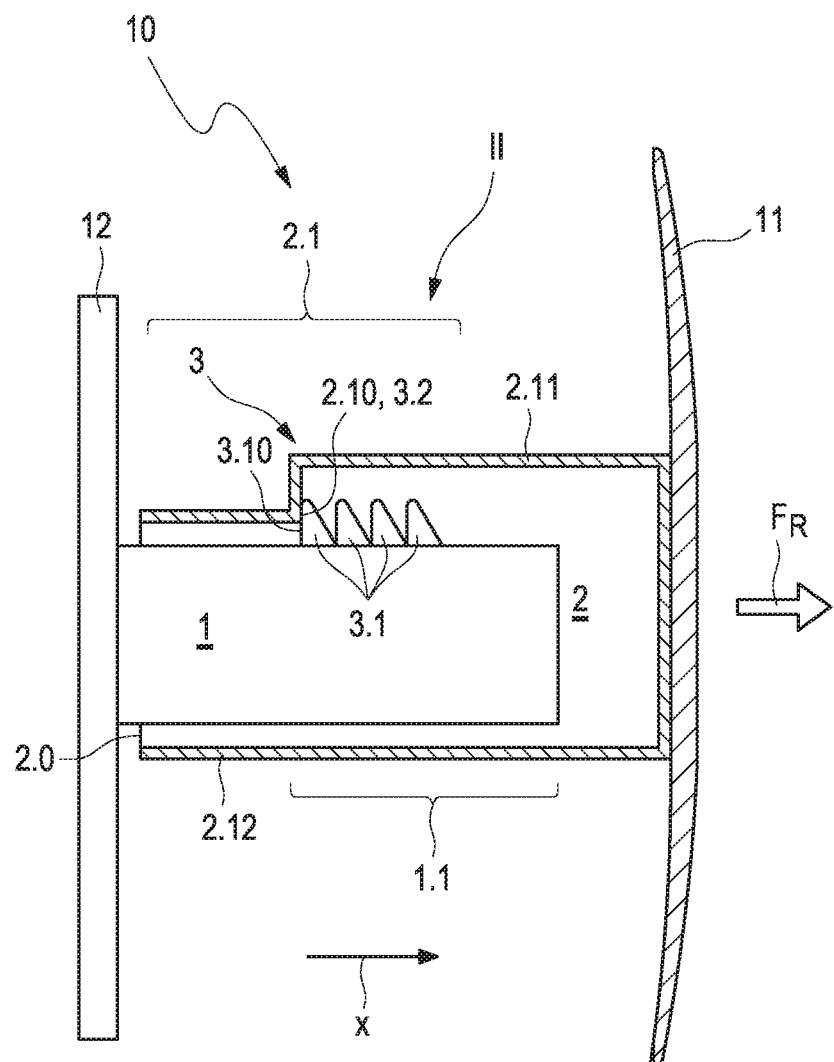
FIG. 2 shows a schematic illustration of the pedestrian protection device according to FIG. 1 in an activated state.

This exterior component 11 is elastically deformable so that a force F acting on the exterior attachment 11 in the case of a FGS crash load causes a rest position I (see FIG. 1) of the connecting section 1.1 of the first component 1 arranged relative to the second body element 2 to change to a crash position II according to FIG. 2 with the first body element 1 being pushed across the opening 2.0 and further into the hollow profile section 2.1 of the second body element 2 by means of its connecting section 1.1.

In this crash position II shown in FIG. 2, the connecting section 1.1 latches with the hollow profile section 2.1. by means of the latching device 3. The latching device 3 comprises the latching lugs 3.1 arranged on the latching section 1.11 of the connecting section 1.1 and a latching projection 3.2 realized in the hollow profile section 2.1. Due to the elastic deformation of the exterior component 11, a restoring force FR arises with which the deformation can be reversed.

The hollow profile section 2.1 of the second body element 2 is at least formed by two spaced hollow profile walls 2.11 and 2.12 wherein the hollow profile wall 2.11 has a step 2.10 that increases the distance between the two hollow profile walls 2.11 and 2.12 to form the locking projection 3.2 of the latching device 3. The distance between the two hollow profile walls 2.11 and 2.12 is thus increased from a distance a2 in the area of the opening 2.0 to a distance A. According to FIG. 1, the initial section 1.10 introduced into the opening 2.0 and the latching section 1.11 adjoining it have a width a1 measured in the direction of the two hollow profile walls 2.11 and 2.12, which is smaller than the distance a2 in the area of the opening 2.0 up to the step 2.10. This creates a defined distance between the initial section 1.10 both to the hollow profile wall 2.11 and to the hollow profile wall 2.12. The relative position between the first body element 1 and the second body element 2 is nevertheless clearly defined on the basis of the attachment to the structure of the front end 12 or to the exterior component 11.

As already described above, the second body element 2 is displaced by means of its hollow profile section 2.1 onto the connecting section 1.1 if a force F acts on the component 11 slightly widening the two hollow profile walls 2.11 and 2.12 so that the latching lugs 3.1 are overrun by the step 2.10 as the latching projection 3.2 of the latching device 3 until the rear latching lug 3.10, when seen against the direction of travel (x direction), engages with the step 2.10, as shown in FIG. 2. When the latching lugs 3.1 are overrun, they are slightly deformed by the hollow profile wall 2.11 while the hollow profile section 2.1 is slightly pushed on by the force F and by the latching lugs 3.1. Thus, via the paragraph 2.10 and this latching lug 3.10, a positive connection between the first and second body element 1 and 2 is made with which the deformation of the attachment 11 is locked.

This latching of the first body element 1 with the second body element 2 in the crash position II realized by means of the latching device 3 can be released by means of a tool in that the opening 2.0 is expanded as it is supported on the connecting section 1.1 of the first body element 1, which due to the restoring force FR generated by the exterior component 11, causes the latching lugs 3.1 to be traversable by the step 2.10 in the direction of travel (x-direction), thus restoring the rest position I once again according to FIG. 1.

FIG. 2 shows a crash position II of the second body element 2 in which the connecting section 1.1 of the first body element 1 is completely retracted into the hollow profile section 2.1 via the opening 2.0.

Now, it is also possible that the first body element 1 assumes a crash position II at a lower force F in which, compared to the crash position II according to FIG. 2, the connecting section 1.1 of the first body element 1 is as far retracted into the hollow section 2.1. FIG. 3 illustrates this state with a crash position II in which the connecting section 1.1 of the first body element 1 is retracted into the hollow profile section 2.1 only so far that the step 2.10 as the latching projection 3.2 of the second body element 2 engages with the second-last latching lug 3.11 when seen against the direction of travel (x direction) and thus also locks its deformation state. During the traversing step, the latching lugs 3.1 are plastically deformed.

Due to the smaller width $a_1$ of the connecting section 1.1 compared to the distance $a_2$ of the two hollow profile walls 2.11 and 2.12, it is also possible that the second body element 2 together with the exterior component 11 is tilted with respect to the first body element 1 due to the force F.

To facilitate a plastic deformation of the latching lugs 3.1, they consist of a plastic material and, advantageously, the first body element 1 is made entirely of plastic material.

FIG. 4 shows a pedestrian protection device 10 of a vehicle with a first body element 1 and a second body element 2 wherein, however, a front end of the vehicle connected to the body element 1 and an exterior component of the vehicle connected to the second body element 2 are not shown in this FIG. 4 corresponding to FIGS. 1 to 3.

The difference to the pedestrian protection devices 10 according to FIGS. 1 to 3 is that a latching lug 3.1 of the latching device 3 is not arranged on the connecting section 1.1 of the first body element 1 but in the hollow profile section 2.1 of the second body element 2.

According to FIG. 4, the first body element 1 has a connecting section 1.1, which starting from the front, has an initial section 1.10 and a latching section adjoining this initial section 1.10. This latching section 1.11 is formed with a latching projection 3.2 of the latching device 3 as a corrugation 3.20, which is latched in the crash position II of the first body element 1 with the latching lug 3.1 of the latching device 3 arranged in the hollow profile section 2.1.

According to the illustration in FIG. 4, the connecting section 1.1 is inserted in its rest position I with its initial section 1.10 into an opening 2.0, which is formed by two hollow profile walls 2.11 and 2.12 that are spaced apart. The hollow profile wall 2.11 has a step 2.10 that increases the distance between the two hollow profile walls 2.11 and 2.12, and to which a hollow profile wall section 2.110 with the latching lug 3.1 connects.

In the rest position I, according to FIG. 4, the initial section 1.10 is inserted through the opening 2.0 into the hollow profile section 2.1 only up to this step 2.10. Due to an FSG force acting on the second body element 2 due to an FGS force, the connecting section 1.1 of the first body element 1 is displaced from the rest position I far over the opening 2.0 in the hollow profile section 2.1 until the latching lug 3.1 engages with the corrugation 3.20 and thus defines a crash position II. The two body elements 1 and 2 are thus locked in this crash position II by means of the latching device 3.

The hollow profile section 2.1 must be so elastic that the force applied in the area of the corrugation 3.2. pushes this section open. Here, the materials used are designed with respect to their rigidity and strength such that the corrugation is not irreversibly deformed 3.2 when the connecting section 1.1 is inserted into the hollow section 2.1.

The latching of the two body elements 1 and 2 realized by means of the latching device 3 can also be released again by slightly widening the two hollow profile walls 2.11 and 2.12 in the area of the opening 2.0 by means of a tool while being supported on the connecting section 1.1, whereby due to the elastic restoring force, which is generated by the deformable exterior component, the connecting section 1.1 is moved relative to the hollow profile section 2.1 back to its rest position I. For this purpose, the hollow profile section is so elastic that a reversible shape return is made possible.

FIGS. 5 and 6 show a pedestrian protection device 10 for a vehicle in which the elastic deformation of an exterior component 11 of the vehicle is not temporarily locked in accordance with the pedestrian protection devices 10 shown in FIGS. 1 to 4 by means of a latching device 3 but by means of a cone connection 4.

This pedestrian protection device 10 according to FIGS. 5 and 6 comprises a first body element 1 with a connecting section 1.1, with this first body element 1 being connected to a vehicle-fixed structure, namely a front end 12 of the vehicle. This front end 12 is indicated only schematically in FIGS. 5 and 6.

According to FIG. 5, this vehicle-mounted first body element 1 protrudes in its rest position I with the connecting section 1.1 into an opening 2.0 of a hollow profile section 2.1 of a second body element 2, which in turn is connected with a front end with an exterior component 11 of the vehicle. This exterior component 11 may, for example, be a cover of a bumper. Thus, the second body element 2 is firmly mounted to the vehicle's bumper.

The hollow profile section 2.1 of the second body element 2 is designed with at least two hollow profile walls 2.11 and 2.12, which are spaced apart and which are conically tapered to form the cone connection 4 with the connecting section 1.1 of the first body element in the direction of travel (x-direction). Adopting this conical shape, the outer walls 1.12 and 1.13 of the connecting section 1.1 are also spaced apart in their rest position I and aligned parallel to these hollow profile walls 2.11 and 2.12 so that a force F acting on the exterior component 11 in the FGS crash case is used to displace the connecting section 1.1 of the first component 1 from a rest position I (see FIG. 5) into a crash position II, according to FIG. 6, by pushing the first body component 1 further into the hollow profile section 2.1 of the second body element 2 via the opening 2.0 until the frictional engagement created between the outer walls 1.12 and 1.13 of the connecting section 1.1 and the hollow profile walls 2.12 and 2.13 of the hollow profile section 2.1, the relative movement between the connecting section 1.1. and the hollow profile section 2.1 is ended, thereby creating the cone connection 4 in the crash position II defined in this manner.

This connection of the first body element 1 with the second body element 2 realized by means of the cone connection 4 in the crash position II can be released by means of a tool in that the hollow section 2.1 of the second body element 2 is removed with a force supporting the elastic restoring force FR in the direction of travel (x-direction) from the connecting section 1.1 of the first body element 1.

LIST OF REFERENCE NUMBERS

1 First body element of the pedestrian protection device 10
1.1 Connecting section of the first body element 1
1.10 Initial section of the connecting section 1.1
1.11 Latching section of the connecting section 1.1
1.12 Outer wall of the connecting section 1.1
1.13 Outer wall of the connecting section 1.1
2 Second body element of the pedestrian protection device 10
2.0 Opening of the hollow profile section 2.1
2.1 Hollow profile section of the second body element 2
2.10 Step of the hollow section wall 2.11
2.11 Hollow profile wall of the hollow profile section 2.1
2.110 Hollow profile wall section of the hollow profile section
2.12 Hollow profile wall of the hollow profile section 2.1
3 Latching device of the pedestrian protection device 10
3.1 Latching lug of the latching device 3
3.10 Latching lug of the latching device 3
3.2 Latching projection of the latching device 3
3.20 Corrugation as the latching projection 3.2
4 Cone connection of the pedestrian protection device 10
10 Pedestrian protection device of a vehicle
11 Exterior component of the vehicle
12 Structure of a front end of the vehicle
F Force
$F_R$ Restoring force

The invention claimed is:

1. A pedestrian protection device of a vehicle, comprising:
a vehicle-mounted first body element comprising a connecting section;
a second body element comprising a hollow profile section, wherein the connecting section of the vehicle-mounted first body element is movably received in the hollow profile section;
an elastically deformable exterior component connected to the second body element, the elastically deformable exterior component defining an exterior surface of the vehicle, wherein the hollow profile section of the second body element is configured to be displaced from a rest position to a crash position upon application of a force against the elastically deformable exterior component; and
a latching device configured to releasably latch the connecting section of the vehicle-mounted first body element with the hollow profile section of the second body element when set in the crash position.

2. The pedestrian protection device according to claim 1, wherein the latching device includes at least one latching lug and a latching projection.

3. The pedestrian protection device according to claim 2, wherein the at least one latching lug is disposed on the connecting section of the vehicle-mounted first body element, and wherein the hollow profile section of the second body element comprises the latching projection.

4. The pedestrian protection device according to claim 2, wherein the hollow profile section of the second body element includes at least two spaced hollow profile walls, wherein the latching projection includes a step disposed along one of the two hollow profile walls that increases a distance between the two hollow profile walls, and
wherein the at least one latching lug is disposed on the connecting section such that the latching lug is configured to engage with the step as the second body element is displaced into the crash position.

5. The pedestrian protection device according to claim 2, wherein the connecting section has an initial section projecting into the hollow profile section when the second body element is set at the rest position, and
wherein the connecting section has a latching section adjoining the initial section and having the at least one latching lug.

6. The pedestrian protection device according to claim 2, wherein the latching projection comprises a corrugation disposed on the connecting section of the vehicle-mounted first body element, and
wherein the hollow profile section of the second body element comprises the at least one latching lug.

7. The pedestrian protection device according to claim 6, wherein the hollow profile section of the second body element includes at least two spaced hollow profile walls, wherein one of the two hollow profile walls has a step that increases a distance between the two hollow profile walls and wherein the hollow profile section adjoining the step comprises at least one latching lug, and
wherein the corrugation is disposed on the connecting section such that the latching lug is configured to latch with the corrugation when the second body element is set at the crash position.

8. The pedestrian protection device according to claim 6, wherein the connecting section has an initial section projecting into the hollow profile section when the second body element is set at the rest position, and
wherein the connecting section comprises a latching section adjoining the initial section, and the latching section comprises the corrugation.

9. The pedestrian protection device according to claim 2, wherein the latching device is configured to release a positive connection between the at least one latching lug and the latching projection by applying a tool.

10. A pedestrian protection device for a vehicle, comprising:
a vehicle-mounted first body element comprising a connecting section;

a second body element comprising a hollow profile section, wherein the connecting section of the vehicle-mounted first body element is movably received in the hollow profile section;

an elastically deformable exterior component connected to the second body element, the elastically deformable exterior component defining an exterior surface of the vehicle, wherein the hollow profile section of the second body element is configured to be displaced from a rest position to a crash position upon application of a force against the elastically deformable exterior component; and a cone connection between the connecting section and the hollow profile section, wherein the cone connection is configured to detachably connect the connecting section to the hollow profile section by frictional engagement between the connecting section and the hollow profile section when the hollow profile section is set in the crash position.

11. The pedestrian protection device according to claim 10, wherein the connecting section of the vehicle-mounted first body element is conically tapered in a longitudinal direction defining a cone shape, and wherein the hollow profile section of the second body element is cone-shaped that corresponds to the cone shape of the connecting section.

12. A pedestrian protection device of a vehicle, comprising:

a vehicle-mounted first body element comprising a connecting section;

a second body element comprising a hollow profile section, wherein the connecting section of the vehicle-mounted first body element is movably received in the hollow profile section;

an elastically deformable exterior component connected to the second body element, wherein the hollow profile section of the second body element is configured to be displaced from a rest position to a crash position upon application of a force against the elastically deformable exterior component, wherein the elastically deformable exterior component is a bumper cover of a bumper; and a latching device configured to releasably latch the connecting section of the vehicle-mounted first body element with the hollow profile section of the second body element when set in the crash position, wherein the latching device includes at least one latching lug and a latching projection.

13. The pedestrian protection device according to claim 12, wherein the at least one latching lug is disposed on the connecting section of the vehicle-mounted first body element, and wherein the hollow profile section of the second body element comprises the latching projection.

14. The pedestrian protection device according to claim 12, wherein the hollow profile section of the second body element includes at least two spaced hollow profile walls, wherein the latching projection includes a step disposed along one of the two hollow profile walls that increases a distance between the two hollow profile walls, and wherein the at least one latching lug is disposed on the connecting section such that the latching lug is configured to engage with the step as the second body element is displaced into the crash position.

15. The pedestrian protection device according to claim 12, wherein the connecting section has an initial section projecting into the hollow profile section when the second body element is set at the rest position, and wherein the connecting section has a latching section adjoining the initial section and having the at least one latching lug.

16. The pedestrian protection device according to claim 12, wherein the latching projection comprises a corrugation disposed on the connecting section of the vehicle-mounted first body element, and wherein the hollow profile section of the second body element comprises the at least one latching lug.

17. The pedestrian protection device according to claim 16, wherein the hollow profile section of the second body element includes at least two spaced hollow profile walls, wherein one of the two hollow profile walls has a step that increases a distance between the two hollow profile walls and wherein the hollow profile section adjoining the step comprises at least one latching lug, and wherein the corrugation is disposed on the connecting section such that the latching lug is configured to latch with the corrugation when the second body element is set at the crash position.

18. The pedestrian protection device according to claim 16, wherein the connecting section has an initial section projecting into the hollow profile section when the second body element is set at the rest position, and wherein the connecting section comprises a latching section adjoining the initial section, and the latching section comprises the corrugation.

19. The pedestrian protection device according to claim 12, wherein the latching device is configured to release a positive connection between the at least one latching lug and the latching projection by applying a tool.

* * * * *